US007263360B2

(12) United States Patent
Naeini et al.

(10) Patent No.: US 7,263,360 B2
(45) Date of Patent: Aug. 28, 2007

(54) SYSTEM AND METHOD FOR MULTI-PLATFORM, MULTIMEDIA INFORMATION AND COMMUNICATION NETWORK-INDEPENDENT SERVERS

(75) Inventors: Ray Naeini, Longwood, FL (US); Dan Hammond, Dallas, TX (US)

(73) Assignee: InterVoice Limited Partnership, Las Vegas, NV (US)

( * ) Notice: Subject to any disclaimer, the term of this patent is extended or adjusted under 35 U.S.C. 154(b) by 537 days.

(21) Appl. No.: 10/688,327

(22) Filed: Oct. 17, 2003

(65) Prior Publication Data

US 2004/0092267 A1 May 13, 2004

Related U.S. Application Data

(63) Continuation of application No. 09/514,833, filed on Feb. 28, 2000, now abandoned.

(51) Int. Cl.
*H04Q 7/20* (2006.01)
(52) U.S. Cl. ............... 455/445; 370/238; 370/238.1
(58) Field of Classification Search ........... 455/445, 455/416, 418, 552.1, 560, 216; 379/207.01, 379/211.02, 142.07, 220.01, 221.14, 265.11, 379/272, 273; 370/238, 238.1, 447
See application file for complete search history.

(56) References Cited

U.S. PATENT DOCUMENTS

| | | | |
|---|---|---|---|
| 5,303,238 A | 4/1994 | Brodd et al. | |
| 5,613,191 A | 3/1997 | Hylton et al. | |
| 5,978,855 A | 11/1999 | Metz et al. | |
| 6,144,671 A | 11/2000 | Perinpanathan et al. | |
| 6,470,378 B1 | 10/2002 | Tracton et al. | |
| 6,563,800 B1* | 5/2003 | Salo et al. | 370/264 |
| 6,741,853 B1* | 5/2004 | Jiang et al. | 455/418 |
| 2001/0005860 A1 | 6/2001 | Lazaridls et al. | |
| 2002/0002622 A1 | 1/2002 | Vange et al. | |
| 2002/0032806 A1 | 3/2002 | Machin et al. | |
| 2002/0101848 A1 | 8/2002 | Lee et al. | |
| 2002/0138660 A1 | 9/2002 | Eilers et al. | |
| 2005/0003830 A1* | 1/2005 | Campbell | 455/456.1 |

FOREIGN PATENT DOCUMENTS

| | | |
|---|---|---|
| EP | 1 244 262 A1 | 9/2002 |
| WO | WO 01/65337 A2 | 9/2001 |
| WO | WO 01/65337 A3 | 9/2001 |

* cited by examiner

Primary Examiner—Lester G. Kincaid
Assistant Examiner—Sayed T. Zewari
(74) Attorney, Agent, or Firm—Fulbright & Jaworski LLP

(57) ABSTRACT

The inventive system and method provide an integrated information and communication network to any number of associated communication terminals. The invention includes at least one home system or server containing a plurality of applications for performing communication and information services. The home system allows the associated communication terminals to connect and access the applications to receive any of the variety of information and communication services directly from the home system. Communication information in the form of communication signals, data, or any combination of the two may be sent between the communication terminals and the home system. Such information may be provided by the user, by the home system, or may be obtained or processed by any of the available applications. The inventive integration of such services allows communication terminals to receive calling services and information simultaneously in addition to being able to access such information services, such as the Internet, directly.

53 Claims, 4 Drawing Sheets

Associate server with user terminals over communication network

401(a) Provide messaging services
Automatically sending notification signals to user terminal when server receives a message related to user terminals and
Sending messages to a user terminal in response to a request by a user terminal

402

Receive communication information from user terminals

403

Access applications responsive to communication information

403(a) Server may:

1. determine which applications to run by accessing user memory (or)

2. automatically access one or more applications based on sender identification data contained in a message.

404

Send communication information obtained by applications to user terminals

404(a) communication data processed or obtained by an application may be sent to user terminals with a message

SYSTEM AND METHOD FOR MULTI-PLATFORM, MULTIMEDIA INFORMATION AND COMMUNICATION NETWORK-INDEPENDENT SERVERS

CROSS-REFERENCE TO RELATED APPLICATIONS

This application is a continuation of U.S. patent application Ser. No. 09/514,833 filed Feb. 28, 2000 now abandoned entitled "SYSTEM AND METHOD FOR MULTI-PLATFORM, MULTIMEDIA INFORMATION AND COMMUNICATION NETWORK-INDEPENDENT SERVERS," the disclosure of which is hereby incorporated herein by reference.

TECHNICAL FIELD

This invention relates generally to the field of communications systems and more particularly to consumer provision of enhanced telephony and information services.

BACKGROUND

The integration of computers and telephony services has grown tremendously over the last decade. Rapidly advancing technology in combination with decreasing equipment costs have spurred the computer-telephony integration (CTI) industry to new heights. Because of these advancements, telephone service providers are now generally able to offer more complex calling services to a wider population and at a lower cost than previously available.

In the evolution of the modem communication network, all telephone services, including so-called "enhanced" services, were previously provided by telephone switches. Every time a new calling service was developed, the switch had to be re-programmed by the switch vendor to implement that calling service. Because of the enormous complexity and expense of telephone switches, new calling services were generally delayed until the new switches were implemented. This process and the enormous costs of switches typically prohibited smaller telephone service providers from introducing and implementing their own calling services.

In response to this slow progression, the industry developed a design architecture called Advanced Intelligent Network (AIN). AIN architecture allowed much of the call processing and calling services to be removed from the switches and placed in peripheral computing systems. The AIN architecture uses peripheral computing systems as service control points (SCPs), service nodes (SNs), and intelligent peripherals (IPs) to provide call processing and calling services. The telephone switch sends a data package to an SCP or and SN to provide a particular calling service or to manage the call processing. SCPs and SNs delegate certain simple decision-making tasks to IPs to complete as a part of the call service or processing. The switch is, therefore, left to perform its core function of call connection and call routing. Telephone service providers could now invest in relatively inexpensive computers with enough processing power to provide the enhanced calling services and call processing. This opened the market for calling services to the smaller telephone service providers.

The Internet has also experienced an unmatched growth over the last decade. A vast array of information and services is now accessible to anyone with an Internet connection. Most companies have informational web sites or web-enabled databases. Services which were previously limited to interactive calling implementation, such as information services, home banking, stock trading, and retail sales, have now become a mainstay of Internet commerce. Within the last five years, advancing technology has allowed Internet service providers (ISPs) to enter the long distance telephony market in competition with traditional telephone service providers. This evolutionary step established the potential for integration of the Internet with traditional CTI.

Recently, in the wireless phone industry, the internet has become accessible, in a limited format, over a new design of wireless phone. In addition to all of the communication services available to wireless phone users, they now enjoy limited access to the Internet over an expanded visual display on their wireless phones. While this limited integration has increased the services and information resources available to the public, the "integration" is limited simply to Internet access from which the multitude of services available or provided to the wireless customer relies on partnerships between several different, and sometimes competing, industries. It would, therefore, be advantageous to have a fully-integrated communication system which may access and supply pro-active information services from the Internet, corporate databases, and other electronic information media and also provides enhanced calling services and call management all independently from traditional Internet and telephone service providers.

A further problem exists in that as the availability of services for to a telephone user grows, so does the computing power and memory necessary for the communication device to take full advantage of such services. However, power and size requirements inherently limit the deployment of the richness of the applications and services to telephone users and particularly to mobile telephone (or other communication device) users. It would, therefore, be advantageous to integrate the intelligence and processing ability required to take advantage of the increasing sophistication of available services with a system outside of but operationally connected to the communication unit.

SUMMARY OF THE INVENTION

These and other features and technical advantages are achieved by a communication system comprising a plurality of communication terminals, a distribution system for selectively delivering communication information between and among any of the communication terminals, and at least one home system associated with a subset of the communication terminals. Some of the terminals may be wireless phones, hand held devices, pagers or other electronic equipment. The home system includes a distribution system for selectively accessing a plurality of applications. Applications include services such as conference calling, call forwarding, Internet connection, database information retrieval, e-mail, or any other such communication or information service. In this communication system, at least some of the communication terminals include a communication information rerouting system for redirecting at least a portion of any communication information to one or more home systems that are associated with the communication terminal to which the communication information had originally been directed.

In operation, an incoming call to a particular device (for example, a cellular telephone) will be redirected to a home system associated with that device. This redirection can be triggered by a communication from the mobile phone to the switching network via a second communication link or in any other manner. The incoming call is then processed under the control of that home system for accessing one or more of the applications and for providing information (such as a list of names or other data pertinent to the incoming call) from one of the accessed applications to the originally directed communication device. The communication device may include a system for accessing an associated home system to obtain data, either from an application of the associated home system or from an application of a selected other home system, which information relates to or is necessary for the completion of a communication connection directed either to or from the communication device. Thus a user may have profiles of information pertaining to different subjects (such as calling lists, calendars of activities, stock quotes, merchandise stock availability, budget data, etc.) available on his/her home system (or systems). The inventive system will allow a remote user to access this information profile without requiring large amounts of processing power or better power, thereby allowing a user to rely on the home system even when remote from the home system.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWING

For a more complete understanding of the present invention, and the advantages thereof, reference is now made to the following descriptions taken in conjunction with the accompanying drawing, in which:

FIG. 4 is a flowchart illustrating another example of an application of a preferred embodiment of the present invention. Method 400 illustrates a method for providing multimedia data services. In step 401, a server is associated with a plurality of user terminals over a communication network. Step 401(*a*) indicates optional services whereby the server may provide messaging services related to the user terminals. These messaging services may comprise automatically sending notification signals to user terminals when a server receives a message relating to user terminals and sending messages to a user terminal in response to a request sent by that user terminal. These user terminals may use the server to access functions of a home system that are available to the user terminal only through the use of a server. In step 402, communication information is received from at least one of the user terminals. After receiving the communication information, various applications are accessed in step 403. Step 403(*a*) indicates optional services where the server may determine which applications to run by accessing user memory or the server may automatically access one or more applications based on sender identification data contained in a message. After accessing an application, the information obtained by the various applications is then sent to the user terminal in step 404, and step 404(*a*) indicates an optional service where the communication data processed or obtained by an application may be sent to some user terminals with a message.

DETAILED DESCRIPTION

The present invention achieves a fully-integrated communication system with access to the Internet and other internal and external electronic information media for proactively supplying information and enhanced calling services to associated individuals independently from traditional Internet and telephone service providers; and facilitates the removal of a significant amount of intelligent processing power and memory requirements from a communication device through a system and method for associating a plurality of communication terminals with at least one home system or server capable of selectively accessing a plurality of applications for supplying communication and information services.

Figure 1:
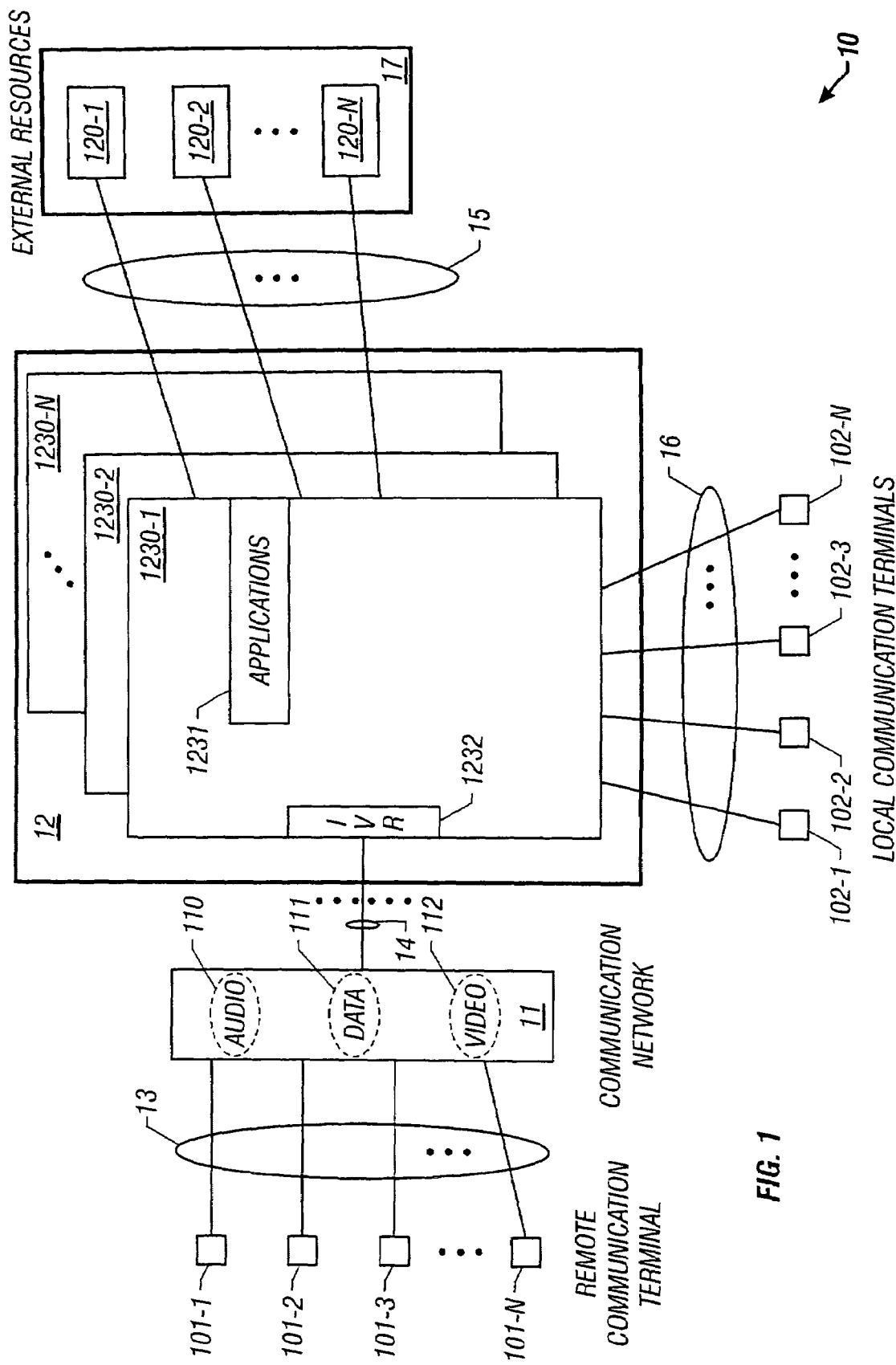
FIG. 1 is a diagram illustrating the basic operation of a preferred embodiment of the present invention.

FIG. 1 shows the basic configuration of a preferred embodiment of the present invention 10. The system 12 comprises one or more home systems or servers 1230-1 to 1230-N each of which may be associated with at least a subset of a plurality of communication terminals 101-1 to 101-N and 102-1 to 102-N. Terminals 102-1 to 102-N are located near the home system 1230-1 and are administered over the local communication network connections 16. Terminals 101-1 10 101-N are remotely located or are mobile terminals which are administered by home system 1230-1 through an external communication network 11, over links 13 and 14. The communication terminals 101-1-101-N and 102-1-102-N include devices such as conventional telephones, conventional telephones connected to additional visual displays, wireless telephones, computers with telephony-capable software and hardware, paging devices, or even hand-held computing devices or organizers (PDAs), or the like.

Communication network 11 carries signals in audio 110, data 111, or even video 112 formats. It is a general reference for communication systems. Communication network 11 comprises any one or a combination of the Plain Old Telephone Service (POTS), Public Switched Telephone Network (PSTN), optical networks including fiber optic communications systems, or Synchronized Optical Networks (SONET), cellular or Personal Communication Service (PCS) communication systems, mobile satellite communication systems, or other wireline and wireless communication networks. Communication network 11 routes and connects calls between communication terminals outside the local control of system 12 and the system itself.

Home system 1230-1 includes a plurality of applications 1231 which control communication services, information services, and integration of the two. It also includes an interactive voice response system (IVR) 1232 for interacting and processing direct communication with communication terminals 101-1-101-N, 102-1-102-N, and also for communication originating from communication terminals not associated with the system 12. Home system 1230-1 may be connected to a plurality of external resources 17 accessible by any of the plurality of applications 1231 or communication terminals 101-1-101-N and 102-1-102-N. External resources 17 could include resources such as bank or brokerage house interactive response units (IRU), the Internet, a corporate web site, a web-enabled database, or any other type of electronic media.

Figure 2:
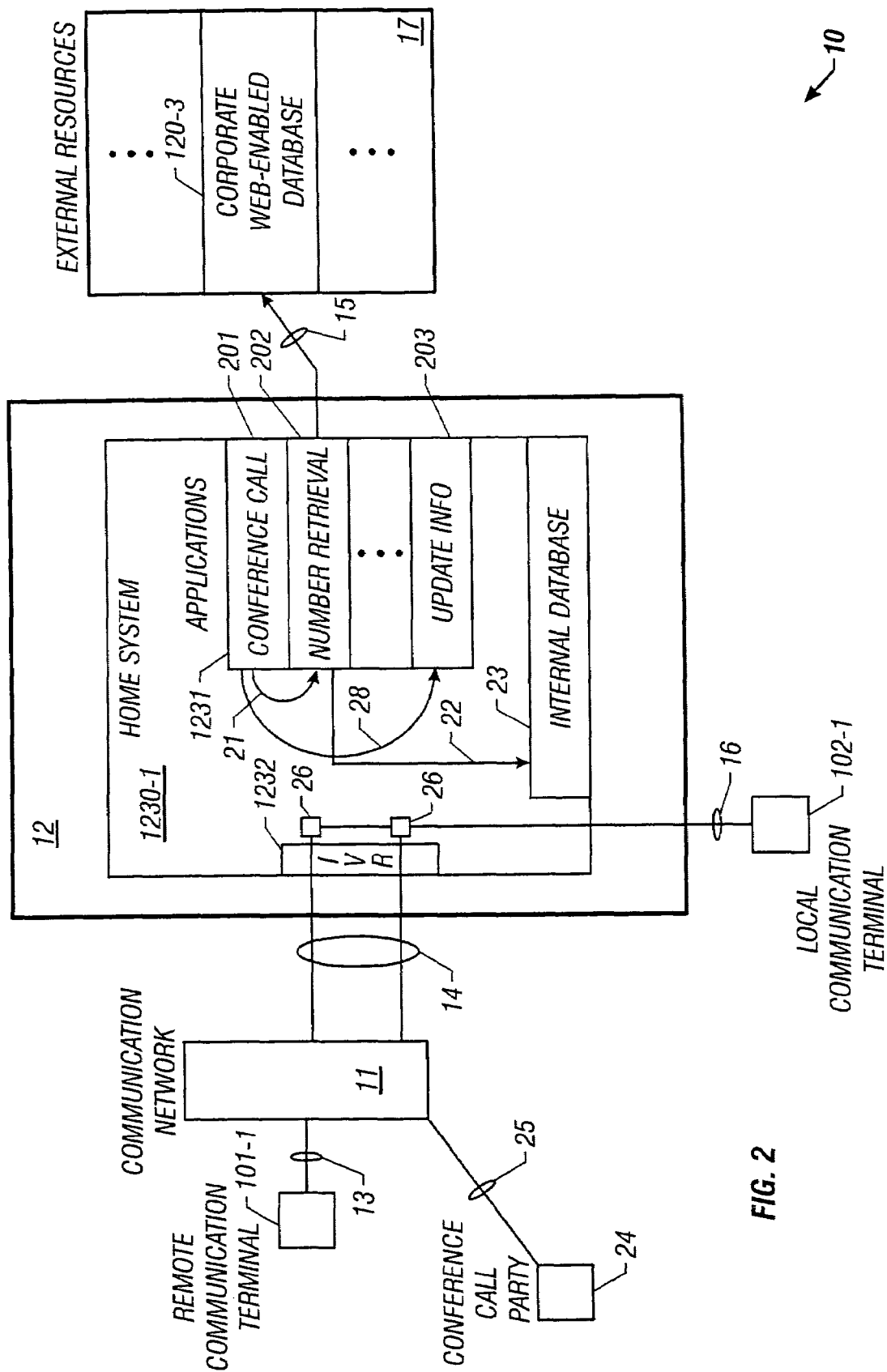
FIG. 2 is a diagram illustrating an example of an operation of a preferred embodiment of the present invention.

In a typical example of an operation as shown in FIG. 2, a caller with an associated communication terminal 101-1 calls into the home system 1230-1 to set up a conference call with two other associates located at communication terminal 102-1 and at non-associated communication terminal 24. The caller may enter a full 7 or 10 digit phone number, a 4 digit extension, or even a single predetermined number or button to connect to the associated home system 1230-1 Once connected, home system 1230-1 interacts with caller through IVR 1232. The caller indicates, through voice, dual tone multifrequency (DTMF) signals, or both, conference call application 201, supplies home system 1230-1 with the extension number of the first party 102-1, the name of the second party 24, and perhaps the company that the second party works for. Home system 1230-1 accesses its internal database 23 to find the second party's 24 phone or extension number or numbers. If the number is not on the internal database 23, home system 1230-1 may activate number retrieval application 202 through internal connection 21 which searches external data resources 17 to find the second party's phone number. For instance, home system 1230-1 may access the second party's company's web site or web-enabled database 120-3 over links 15 to find the phone number. Once both numbers are found, home system 1230-1 calls both parties through communication links 14, 16, and 25 and establishes the conference call with terminal 101-1 through internal links 26. During the time in which home system 1230-1 is establishing the conference call, the caller may stay on the line or hang up his/her phone. Home system 1230-1 will notify the caller's communication terminal 101-1 through links 14 and 13 over communication network 11 when the conference call has been set up. On successful completion of the conference call application 201, home system 1230-1 may use information update application 203 through internal connection 28 to update its internal database 23 with the second party's 24 telephone number found by number retrieval application 202. Under direction of information update application 203, number retrieval application 202 may send the second party's number to internal database 23 through internal connection 22. Home system 1230-1 may then associate the name and telephone number with the company the second party works for as previously provided by the caller.

In this example of the operation of a preferred embodiment of the invention, home system 1230-1 performs the intelligent processes for the conference calling service itself. Communication network 11 only acts as a conduit or pipeline for the calls. In this operation, home system 1230-1 provides the calling service independently from the communication network 11. In prior art systems, the communication network contains the equipment and programming to perform the conference call calling service. The preferred embodiment of the present invention performs those functions from a home system, thereby allowing the system to offer customized and advanced calling services. Thus, by using the inventive system, the remote party has access to the same services without regard of whether he/she is using a remote or local telephone or communication device.

Figure 3:
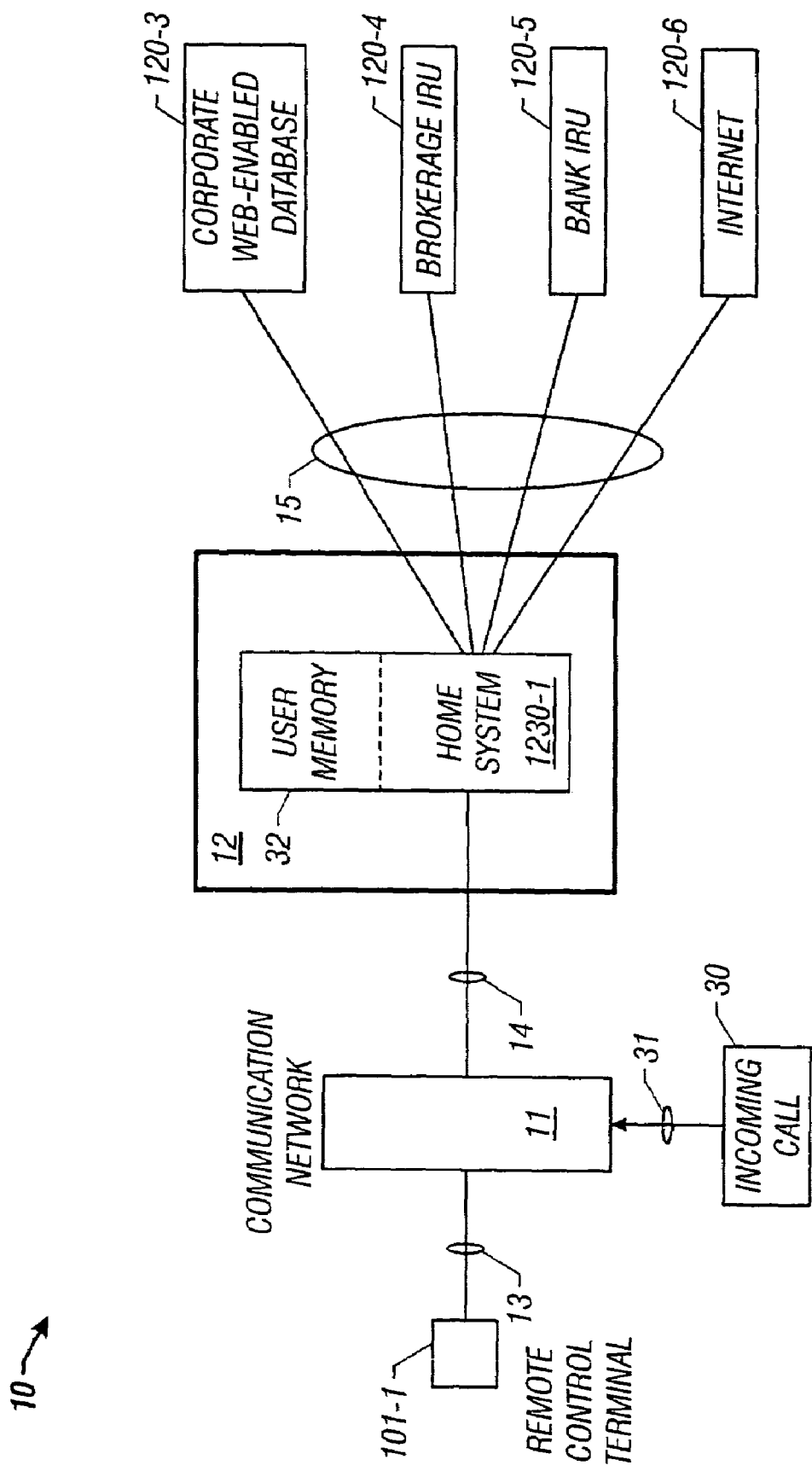
FIG. 3 is a flowchart illustrating an example operation of a preferred embodiment of the present invention.

FIG. 3 illustrates another example of an application of a preferred embodiment of the present invention. The system users will preferably have a user memory 32 location within home system 1230-1 for managing users' information. Incoming caller 30 is directed to a remote associated communication terminal 101-1 through communication network 11 links 31 and 13. Terminal 101-1 receives the call data of incoming call 30 in the form of an Automatic Number Identification (ANI) or Mobile Identification Number (MIN). Before ringing, an intelligent rerouting system located in terminal 101-1 redirects the ANI or MIN portion of the communication information signal to home system 1230-1 back through links 13 and 14. Home system 1230-1 accesses the user's memory location 32 searching for any information or files which are associated with the redirected ANI or MIN or with the name or company associated with the ANI or MIN. If information is available within a reasonable amount of time, home system 1230-1 sends the associated data to the visual display of terminal 101-1, if terminal 101-1 is so equipped, through links 14 and 13 through communication network 11. When the data arrives, terminal 101-1 notifies the user of incoming call 30. Before answering, the user may glance at the data to find out the telephone number of the calling party, the name of the party, the company, and any available pertinent information from the user's own files relating to incoming call 30. With present technology, these steps can be completed without undue delay either to the caller or incoming call 30. Additionally, terminal 101-1 may be configured or configurable to allow user to talk with incoming call 30 at the same time he/she views the information sent by home system 1230-1.

In the previous example, if terminal 101-1 were a wireless telephone, the information can be communicated to the device either with the voice signals of the call or through a separate signal path used with some intercom or two-way radio features of current wireless technology. In this instance the system 12 would use the mobile network linking remote terminal 101-1 to communication network 11 for transmitting and receiving the communication information. Alternatively, the caller using the wireless telephone terminal 101-1 could use a supplemental communication terminal which could connect to home system 1230-1 over a land line communication system. In this case, terminal 101-1 could associate his/her supplemental terminal with home system 1230-1 and direct home system 1230-1 to send all non-call information and data to the supplemental terminal while processing all calling information to terminal 101-1.

Referring again to FIG. 3, home system 1230-1 may also provide a link 15 between a communication terminal 101-1 and an external interactive system 120-4-120-6. If the external interactive system 120-4-120-6 runs in a different format than the communication terminal 101-1 (e.g. Internet HTML 120-6 vs. wireless phone), home system 1230-1 will translate the web format into a format compatible with the wireless communication terminal 101-1. In this example, communication terminal 101-1 can interact fully with the Internet 120-6 without the necessity of a conventional computer connection.

It should be appreciated that the present invention can be configured to perform any number of communication and information related services. The home system can act as a pager service, voice-mail service, fax service, or a clearinghouse for all three services. It can automatically screen or block calls. It can translate phone numbers, maintain databases of related information associated with individual communication terminals, and facilitate connections to the Internet for caller web browsing. It essentially creates a small telephone company at the home system allowing remote and local users great flexibility in handling necessary communication. For example, a service person could display on his/her telephone screen, information from one of the home system applications during a telephone call. This could avoid the need for a separate computer terminal. The information could be communicated using Integrated Service Digital Network (ISDN) or Asymmetric Digital Subscriber Line (ADSL) and can be on the wireline, the data line or on both, and can come as a separate transmission or as a single package of data. The actual transmission of the data can be continuous or bursts (packet or otherwise) and can be voice, data, graphics, video or any combination thereof.

The home system can provide multiple presentations to a user. The user can be using a communication device associated with the home system (a home system user) or the user can be using a communication device that is calling the home user. These multiple presentations then can be multiple media, such as video, voice, text, voice recognition, etc., all of which are adaptable to allow the user easy of communication. The system will synchronize the use of the media such that at any given time the most convenient media will be used. For example, a user may call for the name of the nearest restaurant (or doctor) and the home system then will use a voice response to listen to the request, but might, provide a screen of names for selection by the user. This selection may be made by touching the proper selection on the screen (assuming the screen can respond to position sensitive pressure) or the home system may decide (possibly with help by the user) to allow the user to respond by voice. The selection of the various media modes can be. For example, based on prior usage, or on a knowledge of the communication device capability, or on commands by the user. In this regard, the home system may maintain a data base for storing all of this control data under control of a processor, all in communication with the system. The processor can also control the selection of the various applications that are needed from time to time.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A communication system comprising:
    a plurality of communication terminals;
    a distribution system for selectively delivering communication information between and among any of said terminals;
    at least one home system associated with a subset of said terminals wherein at least one of said terminals is remote from said at least one home system, said home system including a distribution system for selectively accessing a plurality of applications;
    said remote terminal including a communication information rerouting system for redirecting a portion of communication information, which had been originally directed to said remote terminal, for use in accessing an application of said plurality of applications to said at least one home system associated with said remote terminal; and
    a system operative under control of a home system to which communication information has been redirected for accessing one or more of said applications and for providing information from accessed ones of said applications to said originally directed terminal.

2. The system of claim 1 wherein at least one of said communication terminals is a wireless terminal.

3. The system of claim 1 wherein said communication information rerouting system is responsive to origination identification data contained in said communication information.

4. The system of claim 3 wherein said origination identification data comprises data chosen from the group consisting of:
    Automatic Number Identification (ANI) signals;
    Mobile Identification Number (MTN) signals; and
    an e-mail address.

5. The system of claim 1 wherein at least some of said plurality of applications are connected to access external information resources.

6. The system of claim 5 wherein said external information resources are chosen from the group consisting of:
    the internet;
    an electronic database;
    a web-enabled database server; and
    an interactive response unit (IRU) for providing voice, data, or multimedia messages.

7. The system of claim 1 wherein at least one of said plurality of applications is a conference call application.

8. The system of claim 1 wherein at least one of said plurality of applications is a number retrieval application.

9. The system of claim 1 wherein at least one of said plurality of applications is an information update application.

10. The system of claim 1 wherein said home system further includes a user profile of information pertaining to different subjects.

11. The system of claim 10 wherein said remote terminal can access said user profile.

12. The system of claim 1 wherein at least one of said plurality of terminals is a telephone having audio capability and a screen for displaying data communicated thereto from a selected one of said applications.

13. The system of claim 1 wherein said rerouted communication information comprises all signals comprising a telephone call.

14. The system of claim 1 wherein;
    said distribution system for selectively accessing a plurality of applications provides functionality not directly available to said remote terminal; and
    said system operative under control of a home system facilitates operation of said remote terminal to provide functionality of said accessed ones of said applications not available to said remote terminal.

15. The system of claim 1 wherein;
    at least one of said terminals includes a means for accessing an associated home system so as to obtain from one or more of said accessed applications data necessary for the completion of a communication connection directed either to or from, said terminal.

16. The system of claim 1 wherein at least one of said plurality of terminals has audio capability for communicating with a plurality of other terminals under control of said communication system wherein said terminal has data capability for concurrently communicating with at least one of said applications.

17. The system of claim 16 wherein said communication system controls the access to and from all of said applications in response to commands exchanged with said terminal having audio capability.

18. A multi-platform, multimedia information and communication system connected to a communications network comprising:
a plurality of user terminals;
a distribution system for selectively delivering communication information to or from any of said terminals;
at least one server associated with a plurality of applications, said server further associated with at least a subset of said terminals, wherein at least one terminal is remote from said server; and
said remote terminal includes an information routing system for redirecting a portion of communication information, originally directed to said remote terminal, for use in accessing an application of said plurality of applications to said at least one server associated with said remote terminal.

19. The communication system of claim 18 wherein said at least one server further comprises a plurality of external data resources.

20. The system of claim 19 wherein said external data resources are chosen from the group consisting of the internet;
an electronic database;
a web-enabled database server; and
an interactive response unit (IRU) for providing voice, data, or multimedia messages.

21. The communication system of claim 18 wherein said user terminals are chosen from the group consisting of:
a conventional telephone;
a conventional telephone equipped with a visual display;
a wireless telephone;
a paging device equipped with a visual display;
a hand-held computing device (PDA);
a personal computer (PC); and
a network computer.

22. The communication system of claim 18 further including a function responsive to said server for sending communication information processed or obtained by one or more of said applications to one of said user terminals.

23. The communication system of claim 18 wherein said at least one sewer comprises:
a plurality of local applications wherein said applications are selectively accessible by said plurality of user terminals and said at least one server;
an internal database; and
a plurality of internal connections wherein at least one of said plurality of internal connections link at least one of said plurality of local applications to said internal database.

24. The system of claim 23 wherein at least one of said plurality of local applications is linked to at least one of said external data resources.

25. The system of claim 23 wherein at least one of said plurality of local applications is chosen from the group consisting of:
a pager application;
a voice-mail application;
a fax application;
a conference call application;
a number retrieval application; and
an information update application.

26. The system of claim 23 wherein said communication system further comprises an application processing means responsive to said at least one server for accessing one or more of said applications and providing said applications information redirected from said remote terminal.

27. The communication system of claim 18 wherein said information routing system redirects said communication information to said server associated with said terminal based on signals received by said user terminal during a telephone call.

28. The communication system of claim 27 wherein said signals are chosen from the group consisting of:
Automatic Number Identification signals received by said user terminal during a telephone call; and
Mobile Identification Number signals received by said user terminal during a wireless telephone call.

29. The communication system of claim 28 wherein said distribution system carries signals in audio, data, or video formats.

30. A method for providing multimedia data services comprising the steps of:
associating at least one server with a plurality of user terminals over a communication network wherein said user terminals use said server to access functions of a home system that are available to said user terminals only through the use of said server;
receiving first communication information from at least one of said user terminals, said first communication information associated with a communication made with respect to said at least one of said user terminals using a first media type;
accessing one or more of a plurality of applications of said home system providing said functions responsive to said communication information; and
sending second communication information processed or obtained by said one or more of said plurality of applications to said at least one of said user terminals, said second communication information being provided to a user of said user terminal in a second media type, said first and second media types being different media types.

31. The method of claim 30 wherein said at least one server provides messaging services related to at least some of said plurality of user terminals.

32. The method of claim 31 further including the steps of:
automatically sending notification signals to said at least some of said user terminals when said at least one server receives a message relating to said at least some of said user terminals; and
sending said message to related said user terminal responsive to a request sent by said terminal.

33. The method of claim 32 further including the steps of:
automatically accessing one or more of said plurality of applications based on sender identification data contained in said message; and
sending communication data processed or obtained by said one or more of said applications to said at least some of said user terminals with said message.

34. The method of claim 33 wherein said sender identification data includes data chosen from the group consisting of:
Automatic Number Identification (ANI) signals;
Mobile Identification Number (MEN) signals; and
an e-mail address.

35. The method of claim 33 wherein said at least one server determines which one or more of said plurality of applications to run by accessing a user memory.

36. A communication system comprising:
- a local system remote from the public system for handling telecommunications to and from a plurality of communication devices;
- a plurality of applications available to said devices, said availability being controlled by said local system;
- means for allowing any such devices to selectively access any of said applications during a communication connection directed to or from said devices, said communication connection being other than a communication connection providing said selective access to said applications; and
- means for extending the operation of said means for allowing any such devices to selectively access any of said applications to a select set of communication terminals remote from said local system.

37. The system of claim 36 wherein at least one of said select set of remote communication terminals is a wireless phone.

38. The system of claim 37 wherein said wireless phone connects to said local system using the public system.

39. The system of claim 36 wherein at least some of said communication devices receives packet data.

40. The system of claim 36 wherein at least some of said communication devices receives both packet data and continuous data.

41. The system of claim 36 wherein at least one of said plurality of applications is a conference call application.

42. The system of claim 36 wherein at least one of said plurality of applications is a number retrieval application.

43. The system of claim 36 wherein at least one of said plurality of applications is an information update application.

44. A communication system comprising:
- a communication network;
- a plurality of user terminals wherein at least one of said terminals is remote from a server system providing application execution for said remote terminal, said remote terminal including an intelligent information rerouting system for redirecting information originally sent to said remote terminal to said server system;
- at least one server system having a plurality of local applications, said server system further having a user profile of said remote terminal available to an application of said plurality of applications; and
- said server system operable to access said user profile searching for information associated with said redirected information wherein upon locating said information said server sends said located information to said remote terminal.

45. The communication system of claim 44 wherein said plurality of terminals is chosen from the group consisting of:
- a conventional telephone;
- a conventional telephone equipped with a visual display;
- a wireless telephone;
- a paging device equipped with a visual display;
- a hand-held computing device (PDA);
- a personal computer (PC); and
- a network computer.

46. The communication system of claim 44 wherein said remote terminal includes a visual display.

47. The communication system of claim 46 wherein said located information is a telephone number of a calling party and is sent to said visual display of said remote terminal.

48. The communication system of claim 44 further comprising:
- a plurality of external data resources wherein said server searches said external resources in response to said located information.

49. The communication system of claim 48 wherein said external data resources are chosen from the group consisting of:
- the internet;
- an electronic database;
- a web-enabled database server; and
- an interactive response unit (IRU) for providing voice, data, or multimedia messages.

50. The communication system of claim 44 wherein said plurality of applications is chosen from the group consisting of:
- a pager application;
- a voice-mail application;
- a fax application;
- a conference call application;
- a number retrieval application; and
- an information update application.

51. The communication system of claim 44 further comprising:
- a communication link between said remote terminal and an external interactive system wherein said remote terminal can access applications of said external interactive system only through said server.

52. The communication system of claim 44 wherein said user profile of said remote terminal comprises:
- calling lists;
- calendars of activities;
- stock quotes;
- merchandise stock availability; and
- budget data.

53. A communication system comprising:
- a plurality of cellular telephones;
- a plurality of applications for providing communication or information services, said plurality of applications including at least one application selected from the group consisting of a conference call application, a number retrieval application, an information update application, a voice-mail application, and a pager application; and
- at least one home system associated with a cellular telephone of said plurality of cellular telephones, wherein said home system provides application processing using said plurality of applications in response to communications redirected by said cellular telephone, thereby providing functionality of one or more applications of said plurality of applications to one of said plurality of cellular telephones.

* * * * *

UNITED STATES PATENT AND TRADEMARK OFFICE
CERTIFICATE OF CORRECTION

| | | |
|---|---|---|
| PATENT NO. | : 7,263,360 B2 | Page 1 of 1 |
| APPLICATION NO. | : 10/688327 | |
| DATED | : August 28, 2007 | |
| INVENTOR(S) | : Ray Naeini et al. | |

It is certified that error appears in the above-identified patent and that said Letters Patent is hereby corrected as shown below:

Column 3, Line 44, delete "and".

Column 3, Line 45, delete "flowchart" and replace with --diagram--.

Column 3, Line 46, delete "invention." and replace with --invention; and--.

Column 3, Line 47, before the paragraph beginning with "FIG. 4 is a flowchart illustrating another", insert the following: --Figure 4 is a flowchart illustrating an example operation of a preferred embodiment of the present invention.--

Column 3, Line 47, remove the entire text beginning with "FIG. 4 is a flowchart illustrating another" to and ending "terminals with a message." in column 4, line 6 and re-insert the entire text before the paragraph in column 6, line 53 beginning with "It should be appreciated".

Column 9, Line 46 Claim 23, delete "sewer" and replace with --server--.

Column 10, Line 63 Claim 34, delete "(MEN)" and replace with --(MIN)--.

Signed and Sealed this

Sixth Day of November, 2007

JON W. DUDAS
*Director of the United States Patent and Trademark Office*